March 14, 1939. A. F. WILLAT 2,150,792
BEVERAGE DISPLAY AND MIXING MACHINE
Filed July 19, 1932  2 Sheets-Sheet 2

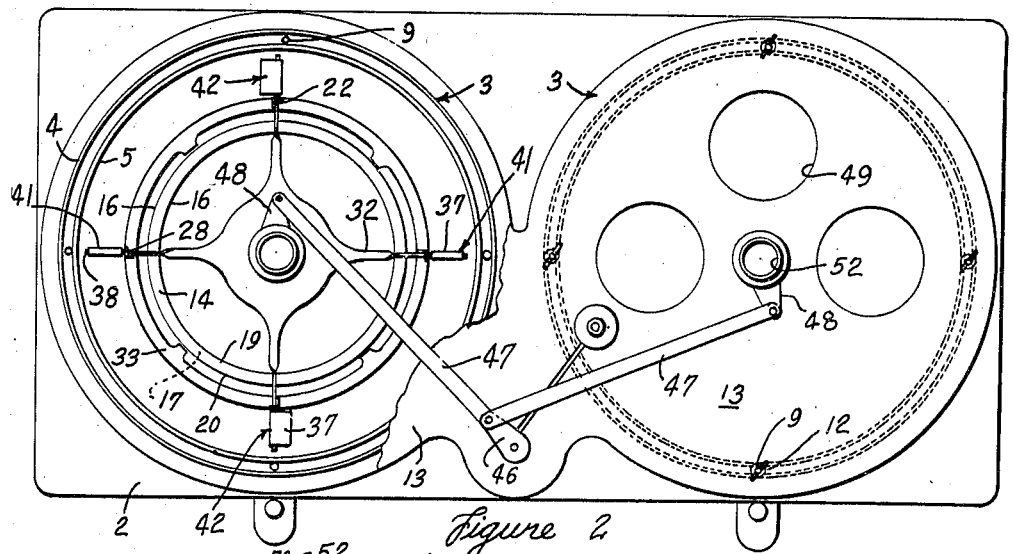
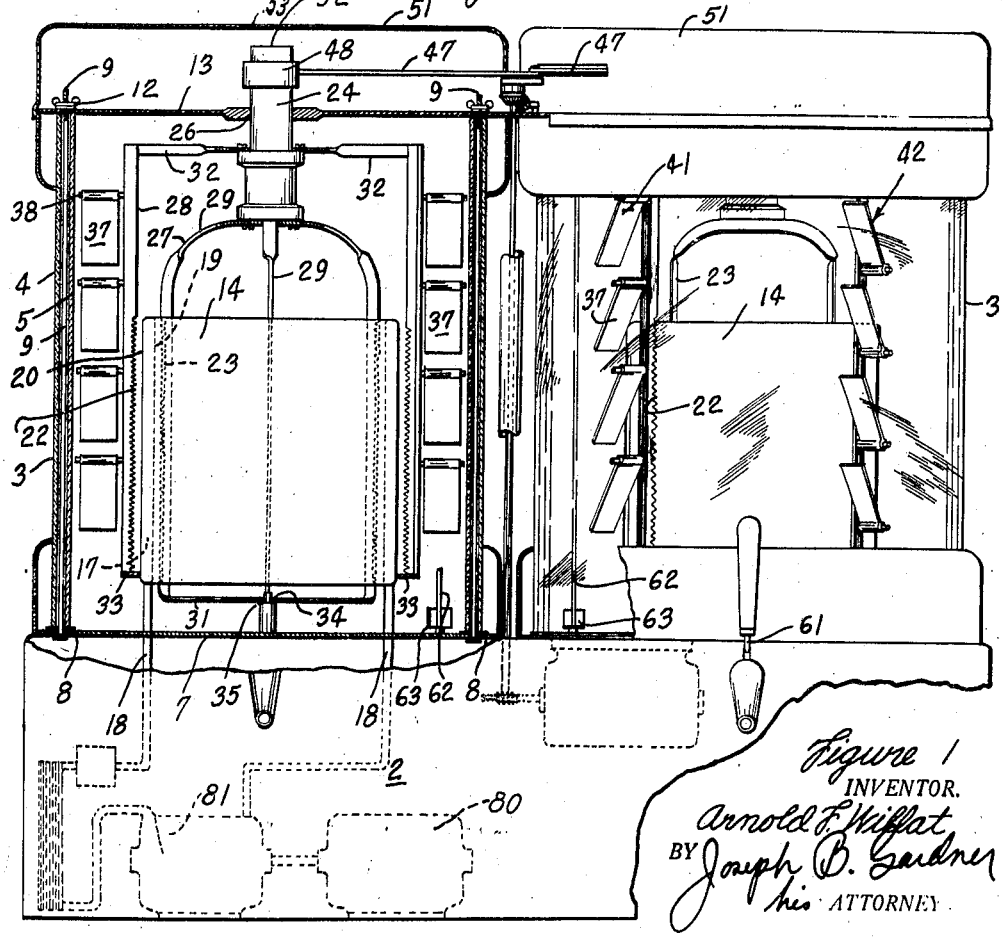

INVENTOR.
Arnold F. Willat
BY Joseph B. Gardner
his ATTORNEY

Patented Mar. 14, 1939

2,150,792

UNITED STATES PATENT OFFICE 2,150,792

BEVERAGE DISPLAY AND MIXING MACHINE

Arnold F. Willat, San Rafael, Calif., assignor, by direct and mesne assignments, of one-third to Albert L. Jacobs, Pittsburgh, Pa., one-third to E. J. W. Keagy, Pittsburgh, Pa., and one-third to Reymer & Brothers, Inc., Pittsburgh, Pa., a corporation of Pennsylvania Application July 19, 1932, Serial No. 623,350

23 Claims. (Cl. 62—114)

The invention relates to a means of displaying and mixing cold beverages and maintaining same in proper condition for dispensing and drinking.

The machine in its present form is particularly adapted for use with partially frozen liquid beverages containing particles of fresh fruit or the like and ice. In order that the beverage will be most palatable and conducive to ready dispensing, it is necessary to keep both the ice particles and fruit or the like evenly distributed throughout the beverage liquid. Ordinarily this is not easy of accomplishment since the fruit particles or the like tend to settle in a slush-like mass while on the other hand the ice particles, not unlike pieces of cork, persist in floating on the surface of the liquid and stubbornly resist almost all efforts to bring about their submersion. While it is true that a vigorous mixing or agitation of the beverage will produce a distribution of the "slush", such action will have no appreciable effect on the ice particles and any submersion thereof will be quickly followed by a hurried return to the surface. In the machine of my invention, means are provided which will furnish the desired stirring action for the "slush" and at the same time set up within the beverage container vertical streams or currents of the liquid which cause the ice particles to descend therewith and keep on circulating through the entire liquid whereby a most thorough distribution of the beverage constituents is provided and the beverage will be given a rich and syrup-like body.

One of the specific objects of the invention is to provide means which will serve to create throughout the entire body of the beverage a multiplicity of individual streams moving vertically in different directions through the full depth of the beverage.

Another object is to provide means which will insure a continuous supply of ice particles to the beverage liquid during the entire period the machine is in operation.

Another object of the invention is to provide in a dispenser arranged to contain and maintain a beverage at a temperature below freezing, means which will serve to effectually break up any concentration of the ice particles on the walls of the beverage container and refrigerator parts in contact with the beverage and at the same time provide for the beverage the desired ice particles in desired form and size.

An additional object of the invention is to provide an effective means for obtaining the mixture of the "slush" and ice particles, which is designed to remain immersed in the beverage during the full cycle of operation so that the over-all size of the dispenser may be confined to the dimensions of the receptacle required for holding the beverage.

A further object of the invention is to provide a dispenser in which the refrigerating element and beverage agitating means, while positioned to lie submerged in the beverage, are so formed and arranged that intimate and effective contact will be afforded with all the beverage in the dispenser without the refrigerating element becoming ice-clogged and insulated or the element and means aforesaid appreciably reducing the volumetric capacity of the dispenser.

A still further object of the invention is to provide a dispenser of the character described, in which the operation of the refrigerating means is controlled by viscosity of the beverage.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a view of the dispenser provided with two dispensing containers, one dispenser being in side elevation and the other in vertical section.

Figure 2 is a plan view of the dispenser, partly in horizontal section.

Figure 3:
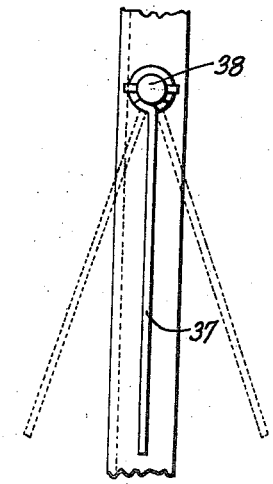
Figures 3 and 4 are end and side views of one of the liquid deflectors used in the device.
Figure 4:
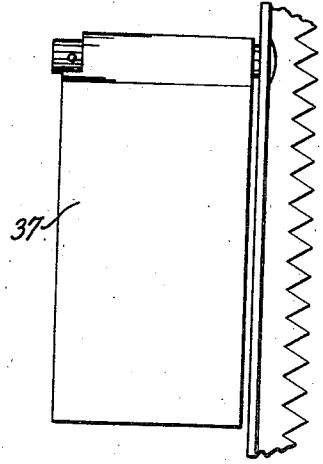
Figure 6:
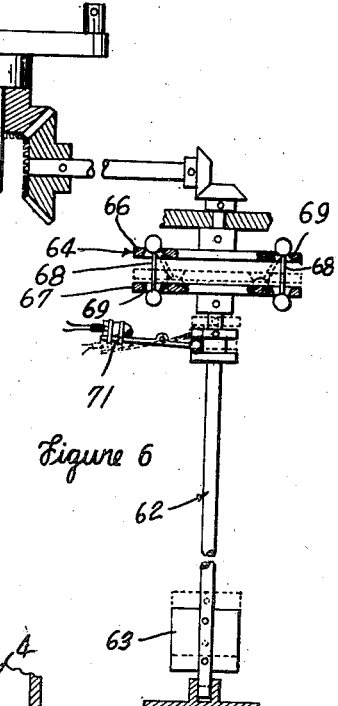
Figure 6 is a detail side view of temperature control means used in the device.

As illustrated in the drawings, the dispenser in its present form comprises a suitable supporting base 2 having mounted thereon one or more containers 3 here shown two in number and designed for the storage and dispensing of beverages served icy cold. Each container is preferably formed with an air jacketed wall defined by concentric cylinders 4 and 5 spaced from each other and set on end upon the top plate 7 of the base. Desirably, the latter may constitute the bottom of the container, and an effective seal is provided between the plate and cylinders by means of gaskets 8 interposed between the plate and lower ends of the cylinders, the desired retention of the cylinders against the plate being afforded through means of bolts 9 extending between the cylinders and engaged at their upper ends by nuts 12. A cover 13 is provided at the top of each container and is held against the upper end of the cylinder by the nuts 12. The cylinders may be formed of any suitable material, and the jacket filled with any insulating medium, but preferably the former are made of glass and the jacket filled with air in order that the contents of the containers may be visible through the sides of the cylinders.

Arranged centrally within each container and coaxial with the side walls thereof is a refrigerating element 14 here shown in the form of a hollow cylinder provided with hollow walls 16 defining an annular chamber 17 for the refrigerant medium. The element is conveniently supported on the base plate 7 in spaced relation therefrom by pipes 18 through which the medium aforesaid is circulated through the chamber 17, the refrigeration plant including the electric motor 80 and the compressor 81 being contained within the base. It will be seen that with the element 14 open at both ends and completely spaced from the top and bottom, as well as the side walls of the container, the beverage may readily circulate through and around the element in intimate contact with all external portions thereof.

Since the inner and outer exterior sides 19 and 20 of the element 14 are cylindrical and the surfaces are smooth and continuous, the element readily lends itself for use in connection therewith of means for easily and effectively scraping or removing any ice formed on its sides so that the insulation of the walls of the elements and the consequent impairment of its efficiency will not be entailed. Furthermore in the present embodiment of the invention such removal of the ice from the element serves as a continuous source of supply of fine ice particles for the beverage. Accordingly, as clearly shown in Figure 1, there are associated with the sides 19 and 20, scraping units 22 and 23 which are mounted for movement in the container—preferably for oscillation or continuous rotation in one direction—in such manner that when in operation practically the entire exterior surface of the element will be subjected to a thorough scraping action. Both units 22 and 23 are fixed to an upright shaft 24 in coaxial relation with the element 14 and disposed in a bearing 26 in the cover plate 13, and both units are comprised of a plurality of horizontally-spaced vertical blades 27 and 28 respectively having one of their edges in close proximity to the associated sides of the element and preferably serrated for facilitating the scraping of the ice therefrom. The blades 27 are held properly positioned at the top by means of extensions 29 secured to the shaft 24 while extensions 31 hold the blades rigidly at the bottom. Likewise with the blades 28, rigidity at the top is obtained by attachment to cross bars 32 fixed to shaft 24, while rigidity of such blades at the bottom is had by means of a ring 33 which encircles and engages the refrigerating element and to which the lower ends of the blades are secured. It is to be noted that the members 22 and 23 and shaft 24 are secured together to provide a unitarily revoluble structure, and as here shown, to afford support for the latter for rotation and as a means functioning with shaft 24 and bearing 26 in maintaining the proper positioning of the blades 27 in the element, cooperating bearing members 34 and 35 in axial alignment with shaft 24 are provided on the extensions 31 and plate 7 respectively, engagement or disengagement of the members 34 and 35 being arranged to be effected by vertical displacement of one relative to the other. It is to be further noted that the members 22 and 23 are so connected together and to the shaft 24 that vertical displacement thereof as a unit is afforded, and removal of such unit from or replacement thereof for operative positioning on the refrigerating element may be effected upon said displacement. It will now be clear that on rotation of the unit in a manner causing the blades to move over the entire or major portion of the surface of the element sides, no film of ice of any appreciable depth can form on the element to impair the heat transferring properties of the walls thereof.

The cutting edge of the scraping blades is formed with small uniformly spaced teeth as in a saw, so that the ice in being removed from the element is broken up evenly into particles of a size desirable for use in the beverage to increase its palatability. Thus as long as the machine is in operation a supply of ice particles will be continuously fed to the beverage liquid.

One of the most important features of my invention is the provision of efficient means serving firstly for stirring the "slush", secondly for keeping the liquid at a uniform temperature and circulating in the container so that the desired physical and chemical state of the beverage may be maintained at all times, and thirdly creating and maintaining in the container a plurality of streams or currents of the liquid which are caused to circulate in a manner insuring the ready and complete descension and submergence of the ice particles suspended in the liquid. The effective accomplishment of the above by means or mechanism utilizing many parts of the other mechanism in the dispenser affords the additional advantage of proper co-relation in operation of the mechanisms, avoiding duplication of many parts, and reducing the cost of manufacture and operation. In the present embodiment of the invention the mixing or circulating means aforesaid is incorporated with the mechanism for preventing the massing of ice on the refrigerator element and the breaking of the ice into small particles, and not only includes parts of the latter mechanism but is motivated in a manner suitable for motivation of the scraping mechanism whereby the same driving mechanism and mounting means may be used for both. Carried on the rotatable scraping structure, preferably for positioning close to the side walls of the container, are a plurality of deflectors 37 mounted to swing through a limited arc. As here shown the deflectors are pivotally mounted on pins 38 carried on the blades 28 and as will be clear from Figures 1 and 2, a set of the deflectors are carried on each blade in vertically spaced relation and with the pins in vertical alignment each set of the deflectors extending for the greater portion of the depth of the container. In the present instance, four sets of deflectors are provided and the sets are spaced equidistantly around the container. By reference to Figure 2, it will be seen the deflectors of alternate sets 41 are mounted in inverted relation to the deflectors in the remaining sets 42, that is the deflectors in the first sets are mounted with the pins at the upper end of the deflectors, while the deflectors in the second sets are mounted with the pins at the lower end of the deflectors. Each deflector is limited to move out of its vertical position to a point at either side thereof through an acute angle. It will now be clear that on rotation of the carrying structure in a given direction all the deflectors immersed in the liquid will be forced backward by the latter to its rearward position whereby the liquid will be divided into streams between the deflectors to flow in a direction defined by the angle of the deflectors engaged thereby. Thus the liquid flowing between the deflectors in set 41 will be caused to move downwardly through the container while the liquid passing between the deflectors in set 42 will be thrust upwardly. In this manner the ice particles and any other substances in the beverage tending to separate from the remainder and stay at the top will be forced downwardly through the depth of the liquid in intimate association with the entire contents thereof, and conversely the "slush" and any other substance in the beverage tending to precipitate and descend to the bottom of the container will be thrust upwardly to mix with the substances at the top of the beverage as well as with the remainder of the contents. Since the downward current is thus accompanied with a corresponding upward current, a smooth and continuous circulation of the liquid is thus set up and the ice particles will readily follow the course of the current to thus insure their complete mixing and retention throughout the liquid. It will be evident that as the rotating structure advances, liquid is caused to pass successively through the different sets of the deflectors and alternately subjected to vertical movement in opposite directions, thereby insuring a thorough agitation of the contents and a uniform distribution of the separate and solid particles in the beverage.

As an added insurance of the subjection of all the beverage to the full action of the deflectors, the rotating structure is preferably caused to oscillate or reverse its direction of motion intermittently. In this way when the structure is rotated reversely of the direction first mentioned, the deflectors will be swung to a reverse position to thus impart a similar vertical flow of the liquid but through a different channel than that caused by the preceding movement of the rotary member and with the horizontal component of the movement of the flow in an opposite direction. Since, in the operation of the deflectors, the liquid is directed somewhat horizontally as well as vertically, and the direction of the horizontal movement is entirely reversed on each change in the direction of movement of the rotary carrier, a most complete agitation and intermixture will result. In the present design, since the scraper blades are a part of the rotating structure, the oscillatory movement of the latter in each direction is arranged to extend to at least 90 degrees so as to insure a complete scraping of the refrigerator element walls. The desired oscillation of the rotary carrier may be effected in any suitable manner. As here shown, such movement is provided for by means of a motor-operated continuously-rotating crank 46 which is connected by links 47 to crank arms 48 on the shafts 24. The relation of the cranks 46 and 48 is such that the throw of cranks 48 will be somewhat in excess of a quarter revolution in opposite directions for each revolution of crank 46. It is important to note that the entire mechanism of the mixing means remains contained in the beverage receptacle throughout the entire operation and that in view thereof substantially no extra space is required for such mechanism and the over-all dimensions of the dispenser proper may be governed practically entirely by the size of the container required for the beverage.

The beverage may be introduced into the dispenser through suitable openings 49 in the cover, or if a hood such as member 51 is used, introduction of the liquid may be through a passage 52 in the shaft 24, an opening 53 being provided in the hood in registration with the passage.

Figure 5:
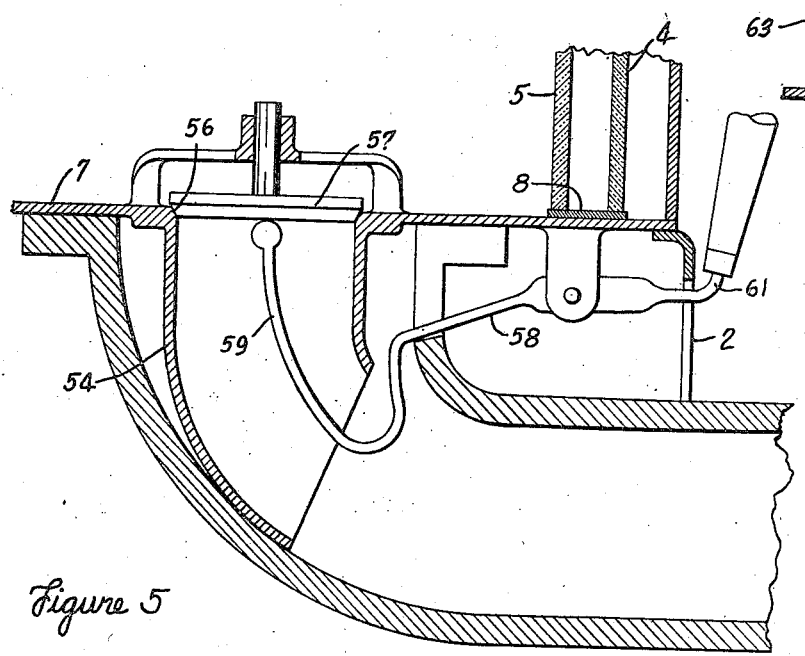
Figure 5 is a vertical sectional view of the delivery portion of the dispenser.

Discharge of the beverage from the dispenser is arranged to be accomplished in a particularly efficient manner. As will be clear from Figure 5, the base plate 7 is provided with a delivery tube 54, the intake opening 56 of which is designed to be closed by a vertically displaceable valve 57 engaging on the upper side of the opening so that the weight of the liquid in the container serves to hold the valve seated. Displacement of the valve is arranged to be effected by means of a lever 58 one arm 59 of which extends into the tube 54 to engage the valve, while the other arm 61 extends to the front of the dispenser and is provided with a handle so the lever may be rocked by the operator to lift the valve. In order to prevent any splashing or leaking of the liquid from the tube when the valve is opened, an extension is provided for the tube with all portions of its upper edge higher than the edges of the discharge orifice of the tube.

Means are also provided for regulating the operation of the refrigerating unit in accordance with the viscosity or consistency of the beverage in the container. As here shown, such means comprises a rotatable member 62 extending downwardly into the container and driven continuously through a suitable driving connection such as the means for oscillating the rotary carrier. A vane 63 is carried by the member near the bottom of the container, and provided on the member at a point intermediate the vane and driving connection is a coupling 64 having sections 66 and 67 which are caused to be moved toward or from each other in accordance with resistance to the rotation of the section 67 with which the vane is associated. The coupling includes a set of links 68 connecting the sections 66 and 67 together, the links extending loosely through openings 69 in the sections so that partial rotative displacement between the sections is permitted but accompanied with a corresponding axial displacement of section 67. Such displacement of section 67 is utilized herein for operating an electric switch 71 which is connected to wires 72 in the circuit of refrigerator motor 80, and thus controlling the electric circuit of the refrigeration mechanism. In this manner, when the consistency of the beverage varies from one predetermined state to another, the section 67 will be displaced from one position to another to close or open the switch as the state of the beverage requires. In order that the member 62 may be located in the container near the side walls, one of the sets of deflectors is made somewhat narrower so that oscillation of the carrier may be effected over a stroke in excess of a quarter revolution.

I claim:

1. In a mixing machine for preparing partially frozen liquids containing some solid particles, a receptacle for the liquid, a carrier member mounted to oscillate in the receptacle about a substantially vertical axis, and reversably positionable deflectors carried by said member arranged to move through said receptacle to create a downwardly directed current and an upwardly directed current in the liquid therein as the carrier is oscillated.

2. In a mixing machine for preparing partially frozen liquids containing some solid particles, a receptacle for the liquid, a carrier member mounted to rotate in the receptacle about a substantially vertical axis, and reversably positionable deflectors on the carrier arranged on rotation of the latter to create oppositely directed vertical currents in the liquid.

3. In a mixing machine for preparing partially frozen liquids containing some solid particles, a receptacle for the liquid, a carrier member mounted to oscillate in the receptacle about a substantially vertical axis, and reversely positionable deflectors on said carrier engageable with the liquid whereby on movement of the carrier in reverse directions the deflectors will be shifted from a position creating a current in the liquid directed obliquely downwardly in one direction to a position creating a current in the liquid directed obliquely downwardly in another direction.

4. In a beverage container, a receptacle for the beverage, a carrier member mounted to oscillate in the receptacle about a substantially vertical axis, a set of reversely positionable deflectors on said carrier engageable with the beverage whereby on reversal of the movement of the carrier the deflectors will be shifted from a position directing the beverage obliquely upwardly in one direction to a position directing the beverage obliquely upwardly in another direction, and a second set of reversely positionable deflectors on the carrier engageable with the beverage whereby on reversal of the movement of the carrier the deflectors will be shifted from a position directing the beverage obliquely downwardly in one direction to a position directing the beverage obliquely downwardly in another direction.

5. In a display and mixing machine for preparing partially frozen liquids containing some solid particles, a receptacle for the liquid, a first means arranged to move through said receptacle to create directed substantially vertical currents in the liquid contained therein and a second means arranged to move through said receptacle to create substantially vertical currents in the liquid in a direction substantially opposite to the direction of currents created by said first means.

6. In a beverage container, a receptacle for the beverage, a carrier mounted to oscillate in the receptacle about a substantially vertical axis, a set of substantially vertically aligned deflectors for the beverage pivoted adjacent their upper ends to said carrier for movement about a substantially horizontal axis, and a second set of substantially vertically aligned deflectors for the beverage pivoted adjacent their lower ends to said carrier for movement about a substantially horizontal axis, the deflectors of each of said sets being limited in movement out of a vertical position to a point at each side thereof through an acute angle.

7. In a beverage container, a receptacle for the beverage, a refrigeration element therein spaced from the side walls and bottom of the receptacle and with its sides arranged for contact with the beverage, a carrier mounted to oscillate in the receptacle about a substantially vertical axis, scraping devices on said carrier for movement across the sides of said element, and means on the carrier disposed between the scraping devices and the walls of the receptacle operative to deflect the beverage upwardly and downwardly throughout the container.

8. In a liquid beverage mixing machine, a receptacle for the beverage, means serving to provide for the beverage a substantially continual supply of ice particles and means in the receptacle for maintaining a downwardly circulating current in the beverage to force the ice particles downwardly therethrough to provide a homogeneous beverage.

9. In a mixing machine for a beverage having particles of ice therein, a receptacle for and a device to circulate the beverage with the ice, a refrigerating means for reducing the temperature of the beverage while in the receptacle, and means controlled by the viscosity of the beverage in the receptacle for operating said first means to maintain said beverage at a substantially predetermined viscosity.

10. In a device of the character described, a refrigerating unit, means for circulating a fluid mixture over said unit to refrigerate said mixture, and means for controlling operation of said unit in accordance with viscosity of said circulated mixture to maintain a substantially predetermined viscosity in said mixture.

11. In a beverage conditioning and dispensing machine the combination of a container, a cylindrical cooling unit disposed in said container, scraping means which oscillates around said unit to remove frozen particles therefrom, and downwardly hanging paddles which swing from shafts set in said scraping means whereby the loosed ice particles are pushed to the bottom of the mixture.

12. In a beverage conditioning and dispensing machine the combination of a container, a refrigerating means providing an ice-forming cylindrical surface in said container, scraping means which oscillates around said unit to remove frozen particles therefrom and downwardly hanging paddles which swing from shafts set in said scraping means whereby the loosed ice particles are pushed to the bottom of the mixture.

13. In a beverage conditioning and dispensing machine the combination of a container, refrigerating means for said container, a frame mounted for oscillation in said container, means for imparting an oscillatory movement to said frame, and a plurality of paddles carried by said frame each hinged at one end thereto and when oscillated by said frame acting to homogenize the mixture whereby the floating particles in the beverage are kept submerged in the draw-off zone of said container.

14. In a beverage dispenser, means for refrigerating a fruit juice mixture, means for circulating mixture over said refrigerating means to increase viscosity thereof, and control means for stopping and starting said circulation means in accordance with mixture viscosity.

15. In a beverage dispenser, means for refrigerating a fruit juice mixture, means for circulating mixture over said refrigerating means to increase viscosity thereof, and control means dependent upon viscosity of said mixture to selectively circulate mixture or prevent circulation of mixture over said refrigeration means.

16. A method of making a fruit juice beverage which comprises confining a body of fruit juice in a container, exerting a freezing action upon such body of juice from within the body of juice to form frozen particles therein and circulating such juice while forming such frozen particles to maintain homogeneity at all times between frozen and unfrozen beverage portions.

17. In a mixing machine for a beverage having frozen particles therein, a receptacle for and a device to circulate the beverage with the frozen particles, refrigerating means for reducing the temperature of the beverage while in the receptacle below the melting point of such frozen particles and means controlled by the frozen condition of the beverage in the receptacle for operating said refrigerating means to maintain said beverage in a substantially predetermined condition.

18. In a device of the character described, a refrigerating unit, means for circulating a liquid beverage mixture over said unit to refrigerate the mixture and means for controlling the operation of said unit in accordance with the refrigerated condition of the circulated mixture to maintain such mixture in a substantially predetermined frozen condition.

19. In a beverage conditioning and dispensing machine of the kind described, a beverage container, a refrigerating unit disposed within said container and in a body of beverage therein, means associated with said refrigerating means for removing frozen particles therefrom as such are formed and means for establishing internal currents within said beverage body to maintain homogeneity at all times between conditioned and unconditioned beverage portions.

20. In a beverage dispenser, means for refrigerating a fruit juice mixture, means for causing fruit juice mixture to circulate in heat exchange contact with said refrigerating means to form frozen particles in said mixture and control means for stopping and starting said circulating means in accordance with the percentage of frozen particles in said mixture.

21. In a beverage dispenser, refrigerating means for conditioning a fruit juice mixture, circulating means for causing said mixture to pass in heat exchange contact with said refrigerating means to produce frozen particles in said mixture and control means dependent upon the percentage of frozen particles in said mixture to selectively continue or discontinue said refrigerating and circulating means.

22. A beverage conditioning machine of the character described comprising a generally cylindrical container adapted to receive a segregated body of unconditioned liquid beverage, means for rapidly lowering the temperature of portions of such unconditioned liquid beverage and having a refrigerating surface within said container in heat exchange relationship with such beverage, means for removing frozen particles from such surface as they form thereon and means for opposing the natural buoyant tendency of said frozen particles to prevent the same from stratifying with relation to said beverage body.

23. A beverage conditioning machine of the character described comprising a generally cylindrical container adapted to receive and confine a body of unconditioned liquid beverage, a refrigerating surface non-exteriorly disposed with relation to said beverage container, means for maintaining said refrigerating surface at a temperature below the freezing point of water whereby frozen particles are formed on said surface from beverage within said beverage container, means for removing such frozen particles from said surface as they are formed and means for establishing internal currents within the body of beverage mixture in said container to prevent stratification thereof.

ARNOLD F. WILLAT.